US011629082B1

(12) United States Patent
Johnson et al.

(10) Patent No.: US 11,629,082 B1
(45) Date of Patent: Apr. 18, 2023

(54) ALGAE SCRUBBER FILTER SYSTEM

(71) Applicant: Clear Water Scrubbers, LLC, Olathe, KS (US)

(72) Inventors: Joshua A. Johnson, Olathe, KS (US); Kyle James Robert Elder, Haymarket, VA (US)

(*) Notice: Subject to any disclaimer, the term of this patent is extended or adjusted under 35 U.S.C. 154(b) by 0 days.

(21) Appl. No.: 17/872,981

(22) Filed: Jul. 25, 2022

(51) Int. Cl.
| | | |
|---|---|---|
| *C02F 3/32* | (2023.01) |
| *C02F 1/00* | (2023.01) |
| *A01K 63/04* | (2006.01) |
| *A01G 7/04* | (2006.01) |
| *A01G 33/00* | (2006.01) |
| *C02F 103/20* | (2006.01) |
| *C02F 103/00* | (2006.01) |

(52) U.S. Cl.
CPC .............. *C02F 3/322* (2013.01); *A01G 7/045* (2013.01); *A01G 33/00* (2013.01); *A01K 63/045* (2013.01); *C02F 1/006* (2013.01); *C02F 2103/007* (2013.01); *C02F 2103/20* (2013.01)

(58) Field of Classification Search
CPC .... C02F 3/322; C02F 1/006; C02F 2103/007; C02F 2103/20; A01G 7/045; A01G 33/00; A01K 63/045
USPC ................................ 210/602, 615, 616, 617
See application file for complete search history.

(56) References Cited

U.S. PATENT DOCUMENTS

| | | | |
|---|---|---|---|
| 5,097,795 A | 3/1992 | Ady | |
| 6,572,770 B1 | 6/2003 | Stewart, III | |
| 9,115,008 B2 | 8/2015 | Farrsih | |
| 10,655,095 B2 | 5/2020 | Farrish | |
| 2013/0193069 A1* | 8/2013 | Aiken | C02F 3/322 210/615 |
| 2015/0034539 A1 | 2/2015 | Farrish | |

FOREIGN PATENT DOCUMENTS

WO    WO 2014/201298 A1 * 12/2014

OTHER PUBLICATIONS

Turbo's Aquatics. "Now in Production: L2 Waterfall LED 2 Cube/day Algae Scrubber," Greater Iowa reef society, Jun. 7, 2012. https://www.greateriowareefsociety.org/threads/now-in-production-l2-waterfall-led-2-cube-day-algae-scrubber.14573/.

\* cited by examiner

*Primary Examiner* — Fred Prince
(74) *Attorney, Agent, or Firm* — Eric B. Fugett; Mark A. Pitchford; Pitchford Fugett, PLLC

(57) ABSTRACT

An algae scrubber system operates via a flow of water and a power source. The algae scrubber system does not require a bubbler. The rate of flow of the water may be variable. The algae scrubber system includes a screen that is configured to be removed from the system without shutting off the flow of water through the system and without spilling the water. The system includes a main body with a water distributor providing water to a tray. A screen hangs from the tray to and grow light(s) encourage algae growth on the screen.

20 Claims, 8 Drawing Sheets

ALGAE SCRUBBER FILTER SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to systems and method for filtering water in an aquarium or pond. More particularly, this invention pertains to algae scrubber systems and methods.

Algae scrubbers filter water by moving water over a rough, illuminated surface in order to grow algae on the surface. As the algae grows, it consumes nutrients from the water including nitrate, phosphate, nitrite, ammonia ammonium, and some metals such as copper. The growth of algae in the scrubber consumes the nutrients that would be used by algae to grow in other parts of the system such as the aquarium or pond itself, thus minimizing cleaning of the aquarium or pond. Additionally, removal of the nutrients from the water promotes healthier fish, invertebrates, and coral in the water. The scrubber may be periodically cleaned or replaced to continue growth of the algae in the scrubber.

BRIEF SUMMARY OF THE INVENTION

Aspects of the present invention provide an algae scrubber system that operates via a flow of water and a power source. The algae scrubber system does not require a bubbler. The rate of flow of the water may be variable. The algae scrubber system includes a screen that is configured to be removed from the system without shutting off the flow of water through the system and without spilling the water. The system includes a main body with a water distributor providing water to a tray. A screen hangs from the tray to and grow light(s) encourage algae growth on the screen.

In one aspect of the invention, and algae scrubber system for a water feature includes a main body, a tray, and in algae growth media. The main body is configured to receive water from the water feature. The tray is supported by the main body when the system is assembled and in an upright position. The trays configured to receive the water from the main body. The algae growth media is configured to receive the water from the tray, grow algae thereon, and provide the water from the tray to a bottom of the main body.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
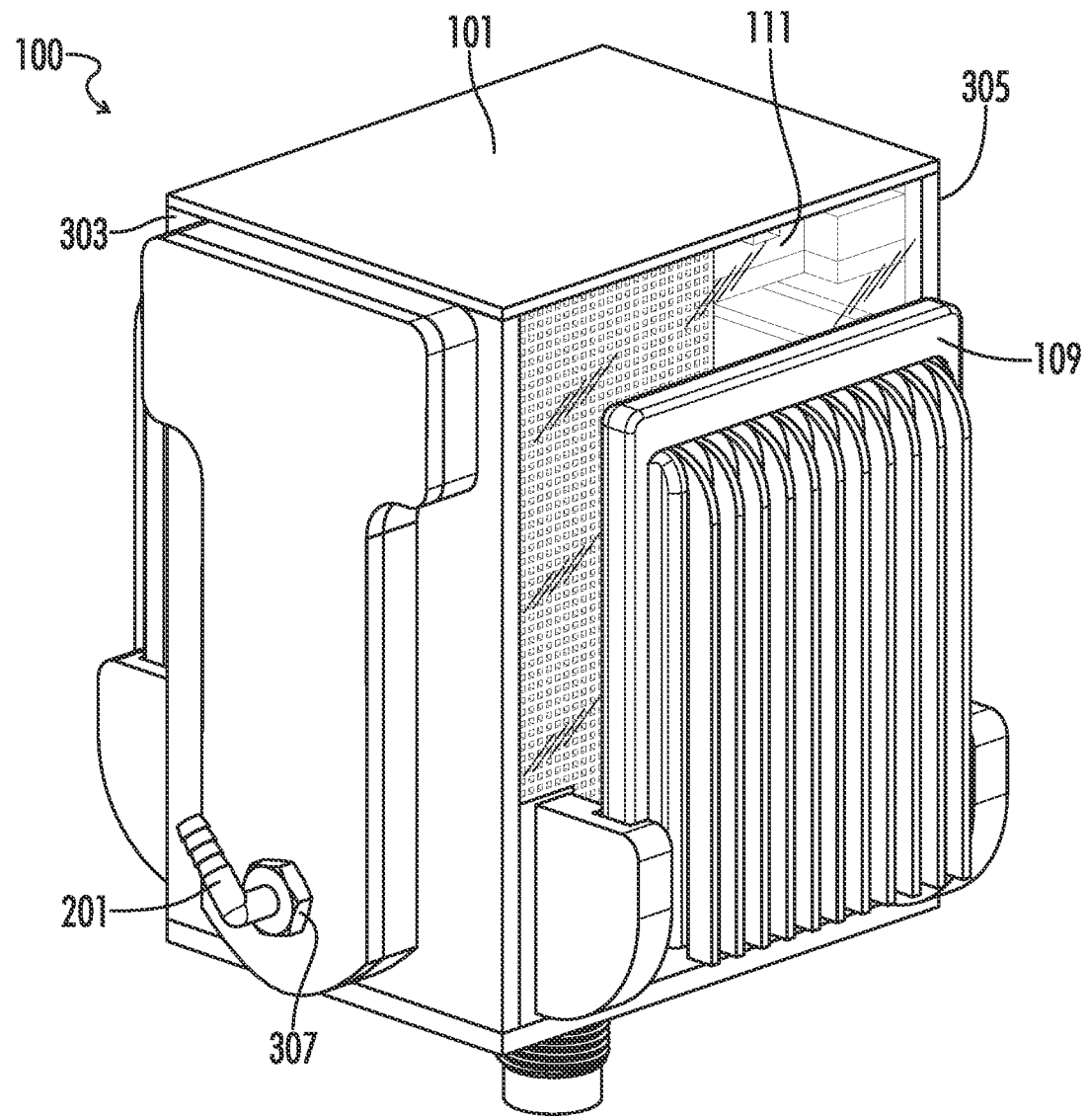
FIG. 1 is an isometric view of an algae scrubber filter system according to one embodiment of the invention.
Figure 2:
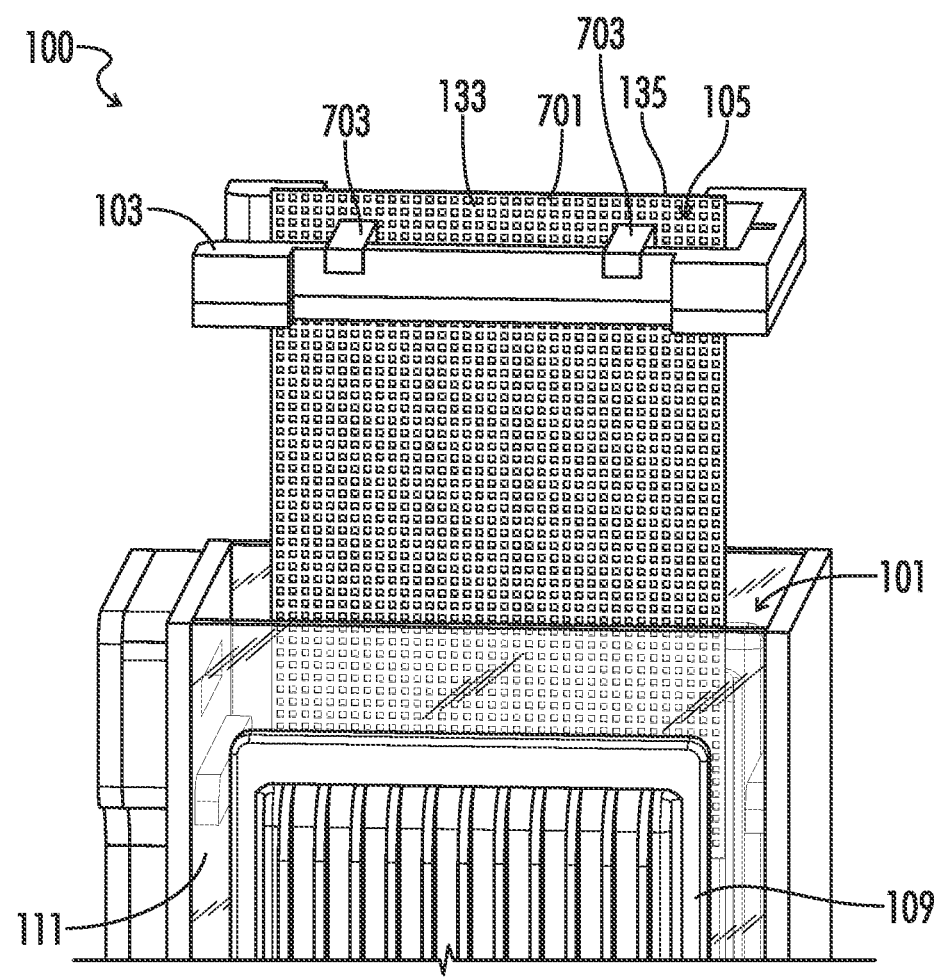
FIG. 2 an elevated front perspective view of the system of FIG. 1.
Figure 3:
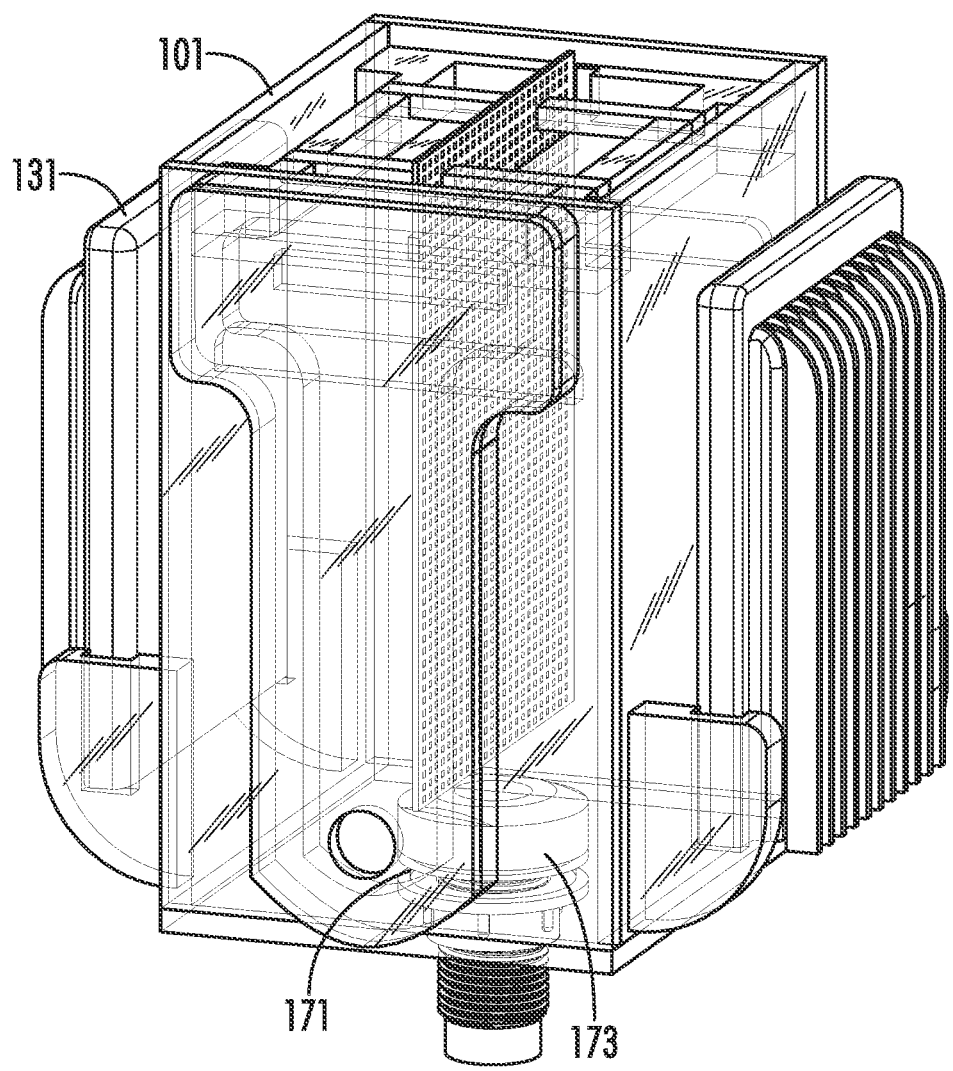
FIG. 3 is an isometric view of a generally transparent algae scrubber filter system according to one embodiment of the invention.
Figure 4:
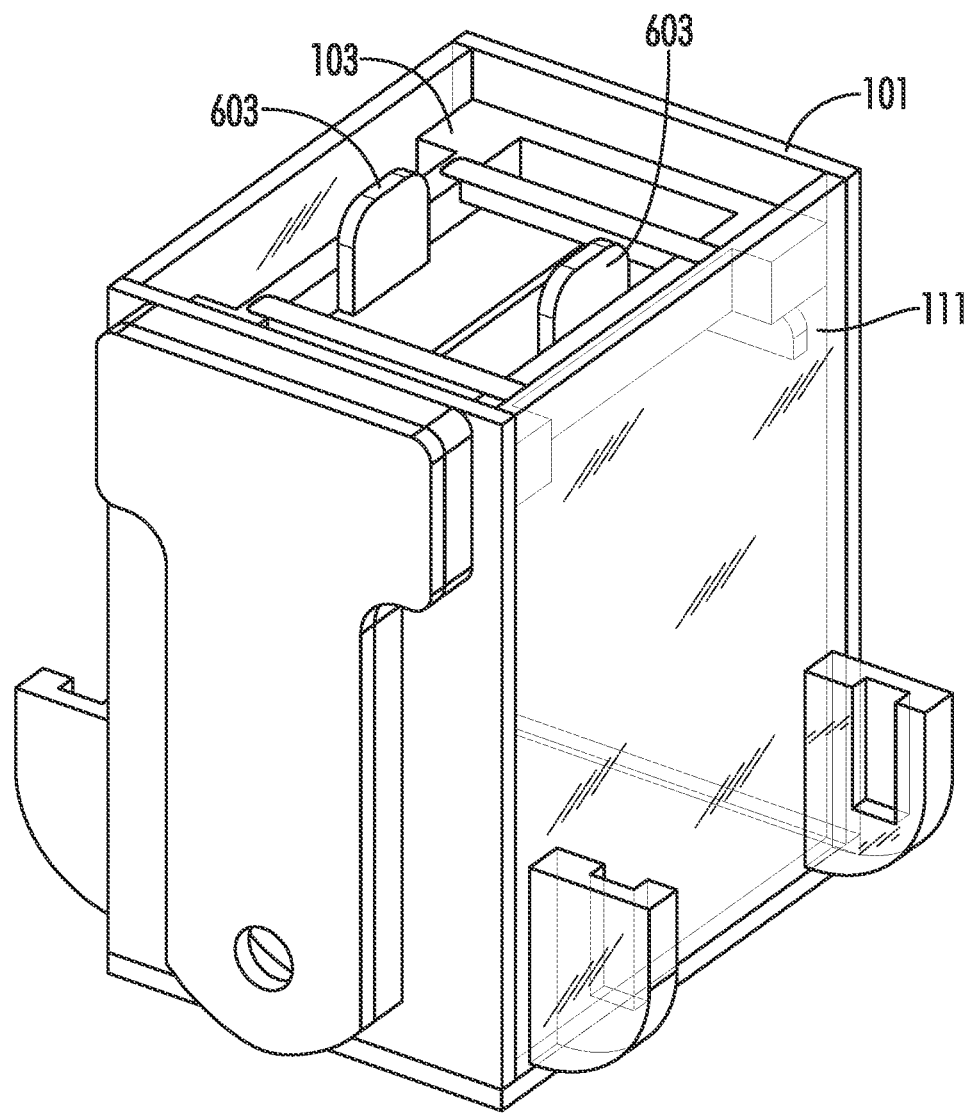
FIG. 4 is an elevated isometric view of a tray of the system of FIG. 3.
Figure 5:
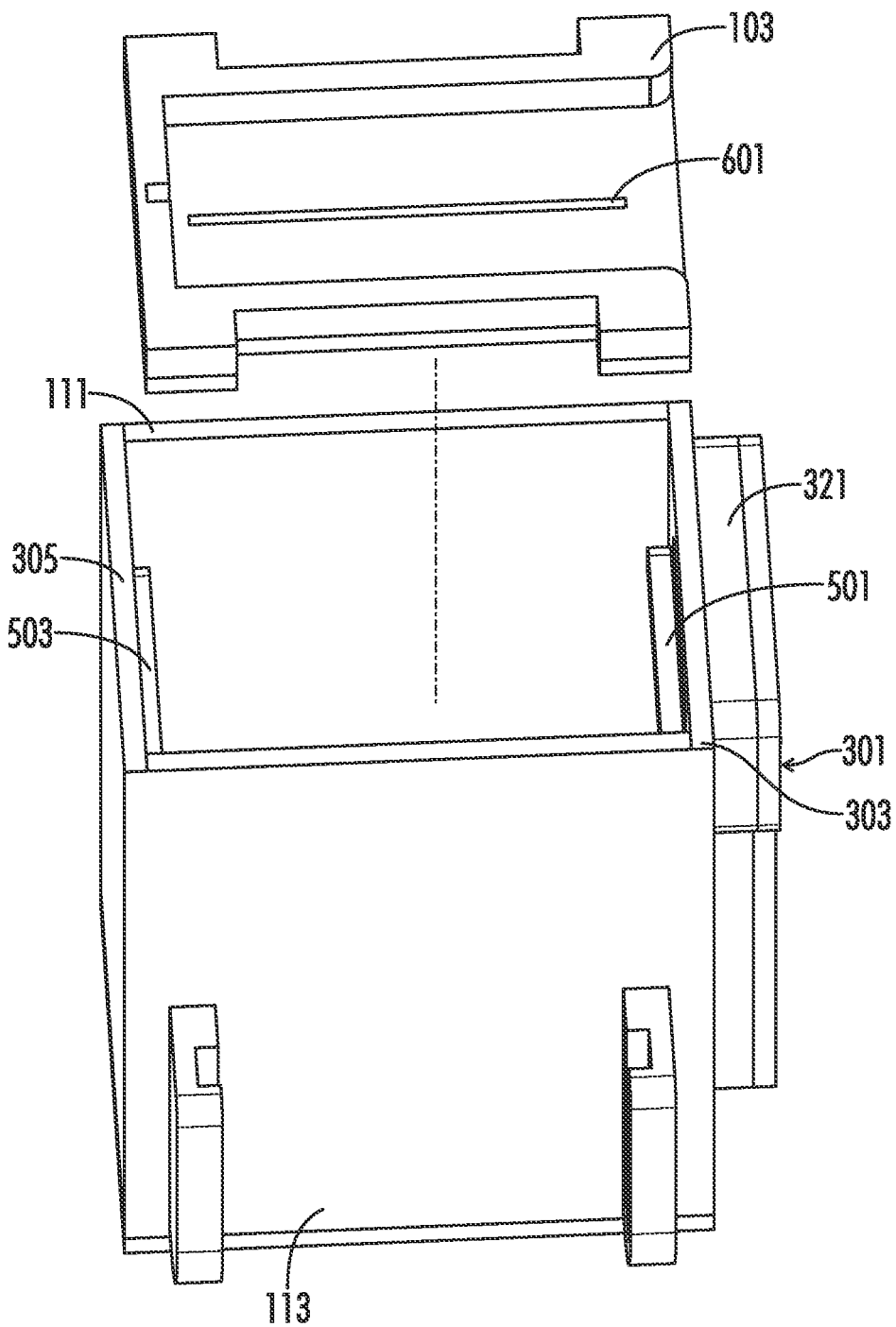
FIG. 5 is an elevated back perspective view of a portion of the algae scrubber filter system of FIG. 1 shown with an opaque front and back for clarity with a tray of the system lifted above a main body of the system.
Figure 6:
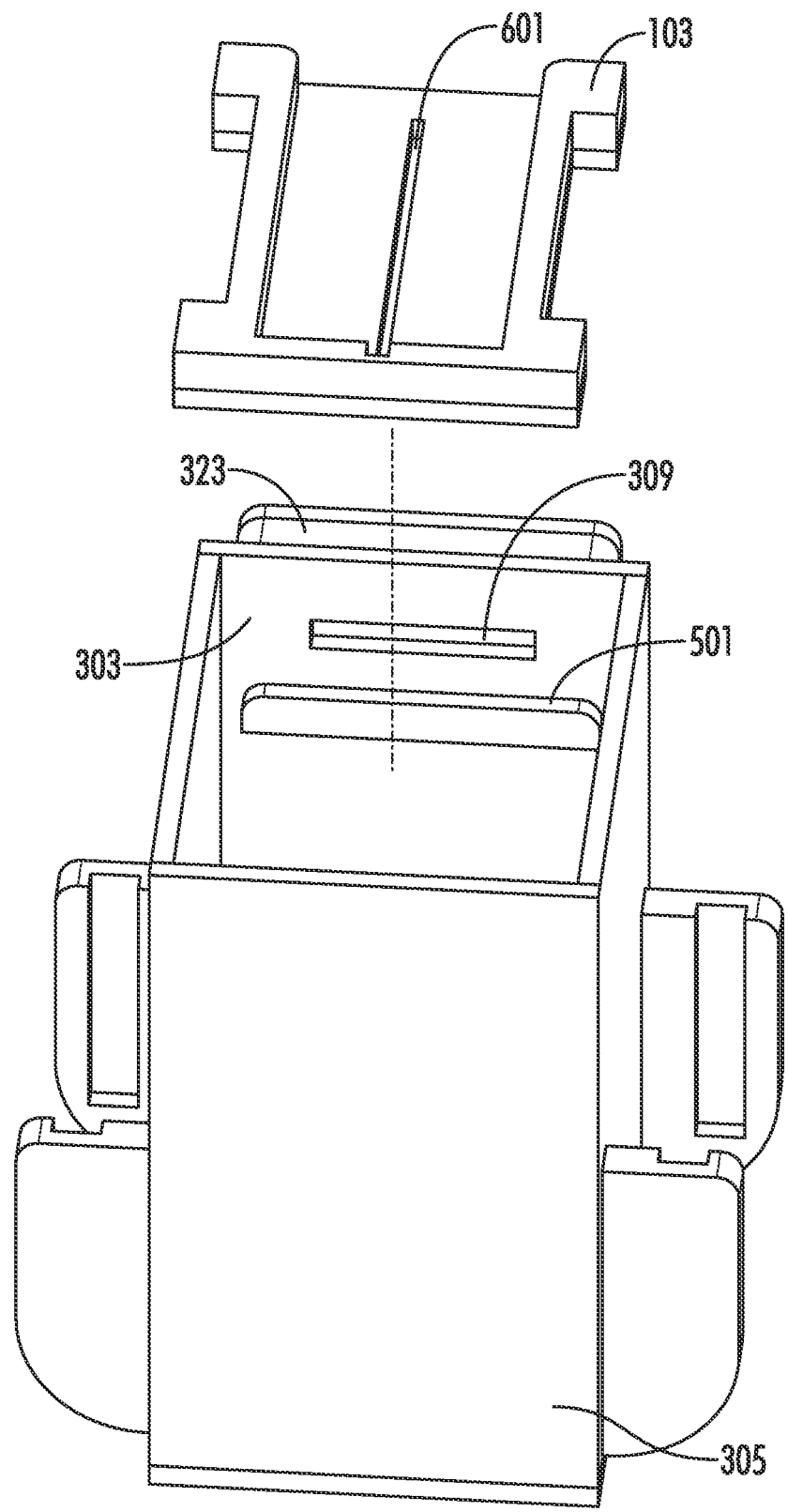
FIG. 6 is an elevated side perspective view of a portion of the algae scrubber filter system of FIG. 1 shown with an opaque front and back for clarity with a tray of the system lifted above a main body of the system.
Figure 7:
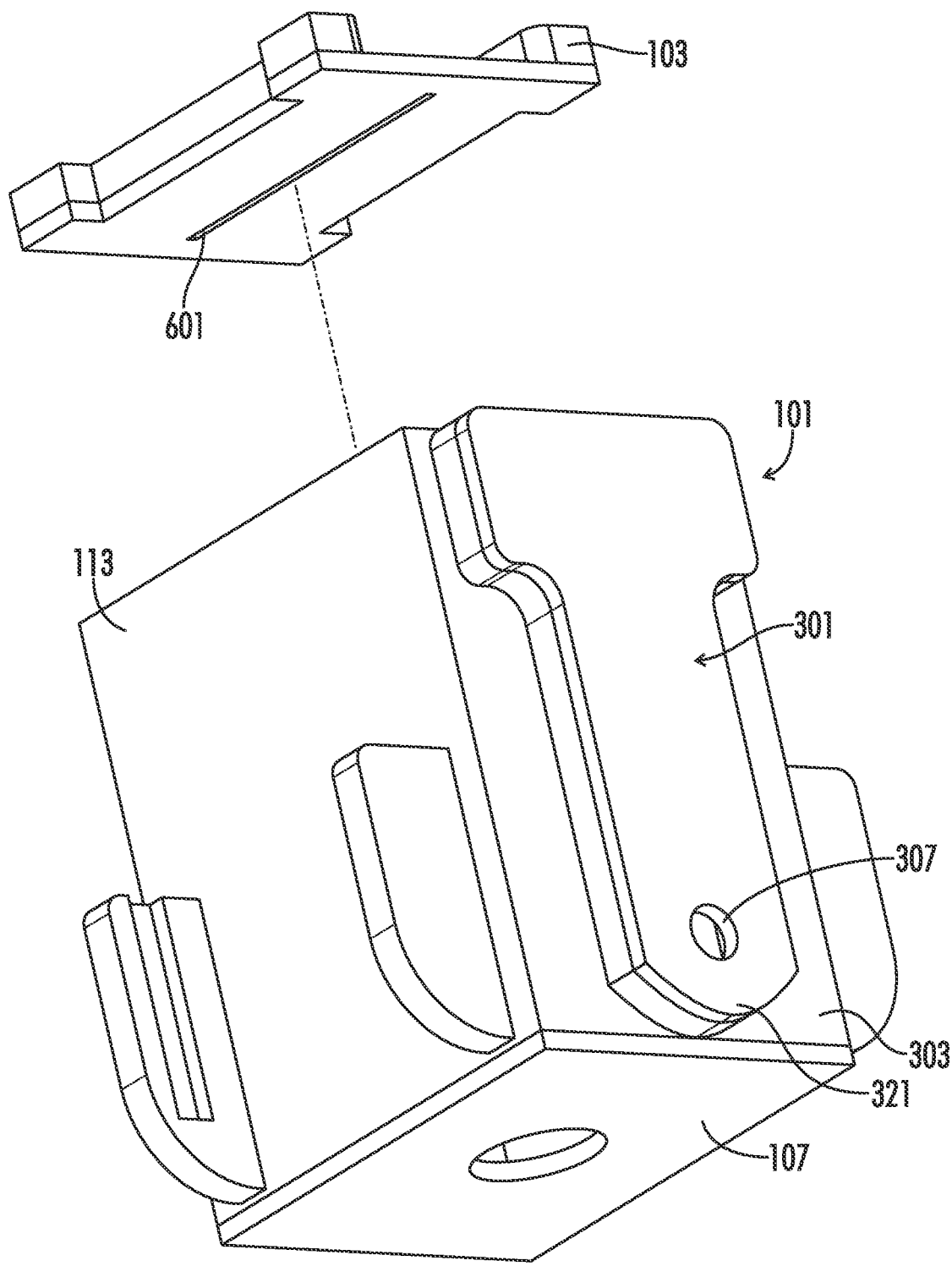
FIG. 7 is a depressed isometric view of a portion of the algae scrubber filter system of FIG. 1 shown with an opaque front and back for clarity with a tray of the system lifted above a main body of the system.
Figure 8:
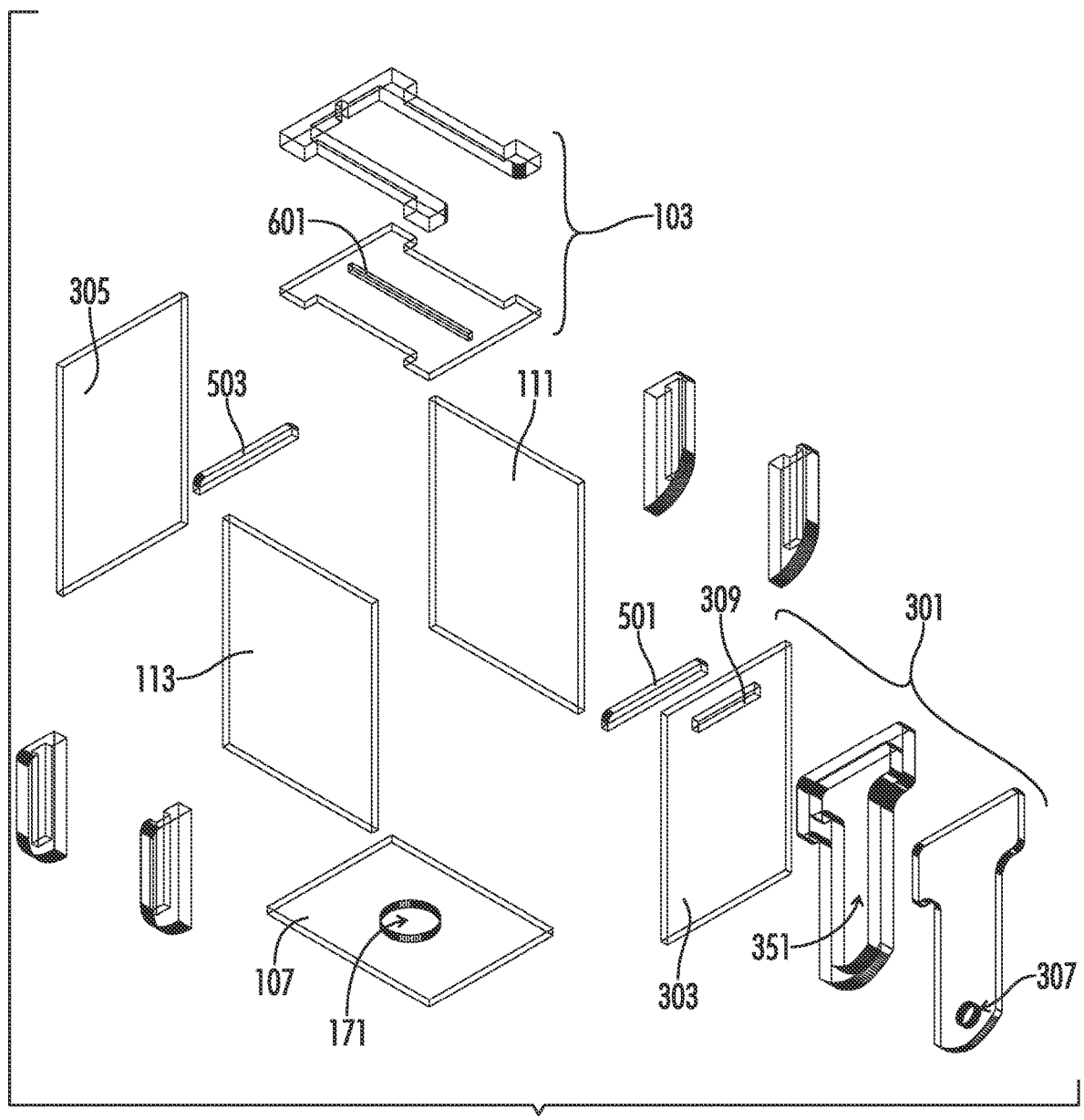
FIG. 8 is an exploded, partial rear isometric view of the algae scrubber system of FIG. 1.

As described herein, an upright position is considered to be the position of apparatus components while in proper operation or in a natural resting position as described herein. As used herein, the assembled and upright position of the algae scrubber filter system is in its proper operational position such with the bottom down and the front, back, and sides extending generally upward therefrom as shown, for example, in FIG. 1. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids.

In one embodiment, and algae scrubber system 100 for a water feature includes a main body 101, a tray 103, and algae growth media 105. The water feature may be an aquarium, pond, fountain, or other such water feature. Water is pumped from the water feature to the outreach scrubber system 100 and returned to the water feature. It is contemplated within the scope of the claims that the algae scrubber system 100 may be fed water by gravity and the water pumped from the algae scrubber system 100 back to the water feature. It is also contemplated within the scope of the claims that various tubing and sump system configurations may be used to transport the water from the water feature to the algae scrubber system 100 and returned the water to the water feature from the algae scrubber system 100.

The main body 101 is configured to receive water from the water feature and provide the received water to the tray 103. In one embodiment, the main body 101 includes a front 111 and a back 113. The front 111 of the main body 101 is substantially transparent. The front 111 and the back 113 of the main body 101 extend longitudinally.

In one embodiment, the main body 101 includes a water distributor 301 configured to receive the water from the water feature and spread the received water laterally across the tray 103 when the system 100 is assembled and in the upright position. In one embodiment, the main body 101 further includes a pair of opposing sides 303, 305 connecting the front 111 of the main body 101 to the back 113 of the main body 101 at opposing longitudinal ends of the main body. In one embodiment, the water distributor 301 includes a fitting 307 and a lateral slot 309. The fitting 307 is configured to receive the water from the water feature via a substantially round tube 201. The lateral slot 309 of the water distributor 301 is in fluid communication with the fitting 307 and extends laterally along the first side 303 of the pair of opposing sides 303, 305. The lateral slot 309 is configured to provide water received via the substantially round tube 2012 the tray 103 when the system 100 is assembled and in the upright position. In one embodiment, the fitting 307 is at a bottom 321 of the water distributor 301, and the lateral slot 309 is at a top 323 of the water distributor 301. In one embodiment, the water distributor 301 includes an internal cavity 351 fluidly connecting the fitting 307 to the lateral slot 309, and the internal cavity 351 of the water distributor 301 is generally T-shaped. In one embodiment, the main body of 101 has a whole 171 in the bottom 107 of main body 101, and the system 100 further includes an overflow drain fitting 173 configured to seat in the whole 171 in the bottom 107 of the main body 101 when the system is assembled. The overflow drain fitting 173 extends upward from the bottom 107 of the main body 101 when the system 100 is assembled and sets a predetermined minimum water level in the main body 101. The overflow drain fitting 173 is configured to provide the water from the main body 101 back to the water feature. That is, the overflow drain fitting 173 drains the water from the main body 101 to a sump system or tubing for return to the water feature.

The tray 103 is supported by the main body 101 when the system 100 is assembled and in the upright position. The tray 103 is configured to receive the water from the main body 101 and provide the received water to the algae growth media 105. In one embodiment, the main body 101 further includes a support 501 configured to support the tray 103 when the system 100 is assembled and in the upright position. In one embodiment, the support 501 is a first support 501 attached to the first side 303 of the pair of opposing sides 303, 305 of the main body 101, and the main body further includes a second support 503 attached to the second side 305 of the pair of opposing sides 303, 305 of the main body 101. In one embodiment, the first support 501 is positioned below the lateral slot 309 when the system 100 is in the upright position such that the first support 501 positions the tray 103 just below the lateral slot 309. In one embodiment, the tray 103 is removable from the main body 101 when the system 100 is assembled and in the upright position by lifting the tray 103 upward from the main body 101. It is contemplated within the scope of the claims that the overflow drain fitting may be in one of the opposing sides 303, 305 of the main body 101.

The algae growth media 105 is configured to receive the water from the tray 103, grow algae thereon, and provide the water from the tray 103 to a bottom 107 of the main body 101. In one embodiment, the tray 103 includes longitudinal slot 601 therein, and the longitudinal slot 601 is configured to provide the water to the algae growth media 105 when the system 100 is assembled and in the upright position. In one embodiment, the algae growth media 105 extends through the longitudinal slot 601 when the system 100 is assembled and in the upright position. In one embodiment, the tray 103 includes a handle 603 configured to lift the tray 103 from the main body 101 while allowing the algae growth media 105 to be lifted up and out of the longitudinal slot 601 in the tray 103. That is, the handle 603 does not interfere with removing the algae growth media 105 from the longitudinal slot 601. In one embodiment, the algae growth media 105 includes a mat 701 and at least one clip 703. The clip 703 is configured to extend laterally from the mat 701, contact the tray 103, and suspend the mat 701 in the longitudinal slot 601 of the tray 103 when the system 100 is assembled and in the upright position. In one embodiment, the mat 701 is a generally planar plastic screen that extends generally vertically within the main body 101 when the system 100 is assembled and in the upright position.

In one embodiment, the system 100 further includes a grow light 109. The grow light 109 includes red and blue light emitting diodes and is mounted to the main body 101 such that light emitted from the red and blue light emitting diodes is directed to the algae growth media 105 through the front 111 of the main body 101 onto a front side 133 of the algae growth media 105. In one embodiment, the grow light 109 is a front grow light 109, and the system 100 further includes a back grow light 131. The back 113 of the main body 101 is substantially transparent, and the back grow light 131 is mounted on the main body 101 when the system 100 is assembled such that the back grow light 131 emits light onto a back side 135 of the algae growth media 105 through the back 113 of the main body 101.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful ALGAE SCRUBBER FILTER SYSTEM it is not intended that such references be construed as limitations upon the scope of this invention except as set forth in the following claims

What is claimed is:

1. An algae scrubber system for a water feature, said system comprising:
   a main body configured to receive water from the water feature;
   a tray supported by the main body when the system is assembled and in an upright position, wherein the tray is configured to receive the water from the main body; and
an algae growth media configured to receive the water from the tray, grow algae thereon, and provide the water from the tray to a bottom of the main body, wherein:
   the main body comprises a front and a back, each extending longitudinally;
   the main body comprises a water distributor configured to receive the water from the water feature and spread the received water laterally across the tray when the system is assembled and in the upright position;
   the main body comprises a pair of opposing sides connecting the front of the main body to the back of the main body at opposing longitudinal ends of the main body;
   the water distributor comprises a fitting configured to receive the water from the water feature via a round tube; and
   the water distributor comprises a lateral slot in fluid communication with the fitting and extending laterally along a first side of the pair of opposing sides, said lateral slot configured to provide water received via the round tube to the tray when the system is assembled and in the upright position.

2. The system of claim 1, wherein:
the system further comprises a grow light.

3. The system of claim 1, wherein:
the system further comprises a grow light; and
the grow light comprises red and blue light emitting diodes.

4. The system of claim 1, wherein:
the system further comprises a grow light;
the grow light comprises red and blue light emitting diodes;
the main body comprises a front and a back;
the front of the main body is transparent; and
the grow light is mounted on the main body when the system is assembled such that the grow light emits light onto the algae growth media through the front of the main body.

5. The system of claim 1, wherein:
the system further comprises a grow light;
the grow light comprises red and blue light emitting diodes;
the main body comprises a front and a back;
the front of the main body is transparent;
the grow light is mounted on the main body when the system is assembled such that the grow light emits light onto a front side of the algae growth media through the front of the main body;
the grow light is a front grow light;
the system further comprises a back grow light;
the back of the main body is transparent; and
the back grow light is mounted on the main body when the system is assembled such that the back grow light emits light onto a back side of the algae growth media through the back of the main body.

6. The system of claim 1, wherein:
the fitting is at a bottom of the water distributor.

7. The system of claim 1, wherein:
the fitting is at a bottom of the water distributor; and
the lateral slot is at a top of the water distributor.

8. The system of claim 1, wherein:
the water distributor comprises an internal cavity fluidly connecting the fitting to the lateral slot;
the internal cavity of the water distributor is generally T shaped.

9. The system of claim 1, wherein:
the main body further comprises a support configured to support the tray when the system is assembled and in the upright position.

10. The system of claim 1, wherein:
the main body further comprises a support configured to support the tray when the system is assembled and in the upright position;
the support is a first support;
the main body comprises a second support configured to support the tray when the system is assembled and in the upright position;
the first support is attached to a first side of the pair of opposing sides, and the second support is attached to a second side of the pair of opposing sides of the main body.

11. The system of claim 1, wherein:
the main body further comprises a support configured to support the tray when the system is assembled and in the upright position; and
the support is positioned below the lateral slot when the system is in the upright position.

12. The system of claim 1, wherein:
the tray is removable from the main body when the system is assembled and in the upright position by lifting the tray upward from the main body.

13. The system of claim 1, wherein:
the tray comprises a longitudinal slot therein, said longitudinal slot configured to provide the water to the algae growth media when the system is assembled and in the upright position.

14. The system of claim 1, wherein:
the tray comprises a longitudinal slot therein, said longitudinal slot configured to provide the water to the algae growth media when the system is assembled and in the upright position; and
the algae growth media extends through the longitudinal slot when the system is assembled and in the upright position.

15. The system of claim 1, wherein:
the tray comprises a longitudinal slot therein, said longitudinal slot configured to provide the water to the algae growth media when the system is assembled and in the upright position;
the algae growth media extends through the longitudinal slot when the system is assembled and in the upright position; and
the tray comprises a handle configured to lift the tray from the main body while allowing the algae growth media to be lifted up and out of the longitudinal slot in the tray.

16. The system of claim 1, wherein:
the tray comprises a longitudinal slot therein, said longitudinal slot configured to provide the water to the algae growth media when the system is assembled and in the upright position;
the algae growth media extends through the longitudinal slot when the system is assembled and in the upright position;
the algae growth media comprises a mat and at least one clip; and
the at least one clip of the algae growth media is configured to extend laterally from the mat, contact the tray, and suspend the mat in the longitudinal slot of the tray when the system is assembled and in the upright position.

17. The system of claim 1, wherein:
the main body has a hole therethrough;
the system further comprises an overflow drain fitting configured to seat in the hole of the main body when the system is assembled, said overflow drain extending upward from the bottom of the main body when the system is assembled and setting a predetermined minimum water level in the main body; and
the overflow drain fitting is configured to provide the water from the main body back to the water feature.

18. The system of claim 1, wherein:
the algae growth media comprises a mat; and
the mat is a plastic screen.

19. An algae scrubber system for a water feature, said system comprising:
a main body configured to receive water from the water feature;
a tray supported by the main body when the system is assembled and in an upright position, wherein the tray is configured to receive the water from the main body; and
an algae growth media configured to receive the water from the tray, grow algae thereon, and provide the water from the tray to a bottom of the main body, wherein:
the tray comprises a longitudinal slot therein, said longitudinal slot configured to provide the water to the algae growth media when the system is assembled and in the upright position; and
the algae growth media extends through the longitudinal slot when the system is assembled and in the upright position.

20. An algae scrubber system for a water feature, said system comprising:
a main body configured to receive water from the water feature;
a tray supported by the main body when the system is assembled and in an upright position, wherein the tray is configured to receive the water from the main body; and
an algae growth media configured to receive the water from the tray, grow algae thereon, and provide the water from the tray to a bottom of the main body, wherein:
the main body has a hole therethrough;
the system further comprises an overflow drain fitting configured to seat in the hole of the main body when the system is assembled, said overflow drain extending upward from the bottom of the main body when the system is assembled and setting a predetermined minimum water level in the main body; and
the overflow drain fitting is configured to provide the water from the main body back to the water feature.

* * * * *